US007609908B2

(12) United States Patent
Luo et al.

(10) Patent No.: US 7,609,908 B2
(45) Date of Patent: Oct. 27, 2009

(54) METHOD FOR ADJUSTING THE BRIGHTNESS OF A DIGITAL IMAGE UTILIZING BELIEF VALUES

(75) Inventors: Jiebo Luo, Pittsford, NY (US); Michael W. Dupin, Rochester, NY (US); Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 724 days.

(21) Appl. No.: 10/426,592

(22) Filed: Apr. 30, 2003

(65) Prior Publication Data

US 2004/0218832 A1 Nov. 4, 2004

(51) Int. Cl.
*G06K 9/00* (2006.01)
*G06K 9/38* (2006.01)
*G09G 3/20* (2006.01)
*H04N 5/228* (2006.01)

(52) U.S. Cl. .................. 382/274; 382/103; 382/167; 345/58; 348/222.1

(58) Field of Classification Search .................. 382/274, 382/118, 103, 167; 345/58; 348/222.1
See application file for complete search history.

(56) References Cited

U.S. PATENT DOCUMENTS

| 2,571,697 | A | * | 10/1951 | Evans ............................ 430/30 |
|---|---|---|---|---|
| 4,203,671 | A | | 5/1980 | Takahashi et al. |
| 5,130,935 | A | * | 7/1992 | Takiguchi .................... 382/167 |
| 5,293,427 | A | * | 3/1994 | Ueno et al. ................... 382/103 |
| 5,781,276 | A | | 7/1998 | Zahn et al. |
| 5,959,720 | A | * | 9/1999 | Kwon et al. .................. 355/38 |
| 6,236,736 | B1 | * | 5/2001 | Crabtree et al. ............. 382/103 |
| 6,377,702 | B1 | * | 4/2002 | Cooper ......................... 382/167 |
| 6,473,198 | B1 | | 10/2002 | Matama |
| 6,700,999 | B1 | * | 3/2004 | Yang ............................ 382/118 |
| 6,933,970 | B2 | * | 8/2005 | Koshiba et al. ............. 348/273 |
| 7,035,456 | B2 | * | 4/2006 | Lestideau .................... 382/164 |
| 7,106,887 | B2 | * | 9/2006 | Kinjo .......................... 382/118 |
| 2002/0136452 | A1 | * | 9/2002 | Schroder .................... 382/167 |
| 2002/0136454 | A1 | * | 9/2002 | Park et al. ................... 382/168 |
| 2003/0012414 | A1 | * | 1/2003 | Luo ............................. 382/118 |
| 2003/0035578 | A1 | | 2/2003 | Dupin et al. |

OTHER PUBLICATIONS

E. Goll et al., "Modern Exposure Determination For Customizing Photofinishing Printer Response," Journal of Applied Photographic Engineering, vol. 5, No. 2, Spring 1979, pp. 93-104.

"Combination of high-level cues in unsupervised single image segmentation using Bayesian Belief Networks" by Pablo Alvarado, Axel Berner, Suat Akyol. *Proceedings of the International Conference on Imaging Science, Systems, and Technology*, vol. 2, Jun. 27, 2002, pp. 675-681.

"A Skin Probability Map and its Use in Face Detection" by J.D. Brand and Dr. J.S.D. Mason. *Proceedings 2001 International Conference on Image Processing, ICIP 2001*. Thessaloniki, Greece, Oct. 7-10, 2001, International Conference on Image Processing, New York, NY, IEEE, US, vol. 1 of 3, Conf. 8, Oct. 7, 2001, pp. 1034-1037.

(Continued)

*Primary Examiner*—Brian P Werner
*Assistant Examiner*—Kathleen S Yuan

(57) ABSTRACT

A method of processing a digital image, including the steps of: assigning belief values to pixels in the digital image, wherein the belief values are proportional to a belief that the pixels are associated with human skin; calculating a brightness adjustment amount based on a statistic of the pixels with belief values exceeding a threshold and the assigned belief values of the pixels; and applying the brightness adjustment amount to the digital image to produce a processed digital image having improved overall brightness.

21 Claims, 8 Drawing Sheets

OTHER PUBLICATIONS

"Statistical Color Models with Application to Skin Detection" by Michael J. Jones and James M. Rehg. *International Journal of Computer Vision*, vol. 46, No. 1, 2002, pp. 81-96, Int. J. Comput. Vis. (Netherlands), Kluwer Academic Publishers, Netherlands.

"On Selecting Colour Components for Skin Detection" by Giovani Gomez. *Pattern Recognition*, 2002. Proceedings of the 16th International Conference on Quebec City, Quebec, Canada, Aug. 11-15, 2002, Los Alamitos, CA, USA, IEEE Computer Soc., US, Aug. 11, 2002, pp. 961-964.

* cited by examiner

METHOD FOR ADJUSTING THE BRIGHTNESS OF A DIGITAL IMAGE UTILIZING BELIEF VALUES

FIELD OF THE INVENTION

The invention relates generally to the field of digital image processing, and in particular to processing a digital image to adjust the brightness of the image.

BACKGROUND OF THE INVENTION

Digital images can be generated directly from scenes by digital capture devices, such as digital still or video cameras, or by scanning an image captured on a photographic negative or slide film, or by various other means. Whatever the form of capture, most digital images are ultimately intended for display either by printed hardcopy, projection, or electronic viewing device. In order to provide the most pleasing display, it is necessary that the color and/or brightness of the displayed image be adjusted according to the subject matter of the scene.

With color photographic printers that make prints from film negatives, various methods for determining amounts of exposure have been known and practically employed. A well-known printing system in which the printing light source intensity is adjusted during red, green, and blue exposures to levels which normalize the resulting integrated transmittances to a near-neutral color balance, i.e., "gray," is based on U.S. Pat. No. 2,571,697 issued to R. M. Evans on Oct. 16, 1951, titled "METHOD FOR CORRECTING PHOTOGRAPHIC COLOR PRINTS." This printing system produces satisfactory results from a large majority of the negatives of a given type of film. It has also been known in the art to adjust the rate of correction for red, green, and blue exposures based on a linear combination of the red, green, and blue large area transmission densities (LATD) of the original to be printed. Since the above-described conventional printing systems are based on the integrated transmission measurements conducted over the whole area of the original, the prints obtained are not always satisfactory. For instance, if the background of the principal subject matter is primarily red (e.g., red curtain or furniture), green (e.g., green grass or foliage) or blue (e.g., blue sky or water), color correction based only on the aforesaid LATD system is unsatisfactory. This problem is known as "color failure." Further, if the background of the principal subject matter has a particularly high or low brightness, the conventional correction based on the integrated transmission density does not give satisfactory results. For example, when the principal subject matter has been photographed with a back light or in a spotlight, conventional correction will give unsatisfactory results. This is known as "density failure" or "brightness failure."

It has also been known in the prior art to determine the exposure in a color printer based on the measured densities of divided areas of color originals in which the entire area of the original is divided into upper and lower, right and left, and central and peripheral sections. The exposure is determined based on a combination of the LATD and the densities of the divided areas. In this system, the yield of satisfactory prints is somewhat raised. However, since the density of the principal subject matter is not accurately measured in this system, the correction is not always effected in the most desirable manner.

It is also known in the art that color failures can be substantially reduced by the use of the subject failure suppression technique described in the journal article "Modem Exposure Determination for Customizing Photofinishing Printer Response,", E. Goll et al., Journal of Applied Photographic Engineering, Vol. 5, No. 2, 1979. For color negative film printing systems, it is further known that the performance of the subject failure suppression technique is improved by determination of an exposure-level-dependent gray estimate for a particular length of film as disclosed in U.S. Pat. No. 5,959,720 issued to Kwon et al. on Sep. 28, 1999, titled "METHOD FOR COLOR BALANCE DETERMINATION."

Further, in looking at printed color photographs, it is well known that most people are concerned about the faces of the figures when present in the scene content. Therefore, in printers, it is desirable that the faces of the figures be printed in a good condition. An exposure controlled to obtain a good skin color and density can increase the yield of satisfactory prints.

It is known in the prior art, as in U.S. Pat. No. 4,203,671 issued to Takahashi et al. on May 20, 1980, titled "METHOD OF DETECTING FLESH COLOR IN COLOR ORIGINALS," to print color originals based on the skin color areas when the originals contain over a certain number of points of skin color. In order to carry out this method, it is necessary first to detect skin color in the color original. Under the method of U.S. Pat. No. 4,203,671 (referenced above), a skin color area is defined as one whose red, green, and blue densities fall within an ellipse when plotted in a two-dimensional coordinate system or within an ellipsoid when plotted in a three-dimensional coordinate system, the axes of which represent the red, green, and blue densities or combinations of the densities of red, green, and blue. When the measured color is contained in the predetermined ellipse or ellipsoid, the color is assumed to be skin. The predetermined ellipse or ellipsoid is constructed by measuring the color attributes of identified skin points in a number of color negatives.

U.S. Pat. No. 5,781,276 issued to Zahn et al. on Jul. 14, 1998, titled "PRINTING OF COLOR FILM" also discloses a method for using points of skin color in determination of printing exposure amounts. This method also first requires the detection of points of skin color in the original, and also accomplishes this by determining whether a point falls within a predetermined color space. The predetermined color space is constructed by measuring the color compositions of identified skin points. The method relies on further logic to distinguish skin points from non-skin points.

U.S. Pat. No. 6,473,198 issued to Matama on Oct. 29, 2002, titled "IMAGE PROCESSING APPARATUS" describes an improved image processing apparatus comprising a device for receiving input image data from a source of image data supply; an image processing device for performing necessary image processing on the received input image data to produce output image data; an extracting device for extracting at least one specified portion of an image carried by the input image data; and a setting device for setting image processing conditions in accordance with the at least one specified portion extracted by the extracting device and the input image data, and the image processing device performs the image processing on the input image data in accordance with the image processing conditions set by the setting device. Matama discloses that the "specified image portion" may be exemplified by the center of an image, its periphery, a principal subject, objects other than the principal subject, the face of a human subject and other parts of the human subject. In addition, Matama discloses varying image processing depending on the size of a face. Furthermore, to perform image processing under different conditions in the face and other regions, a weighting coefficient as a magnification factor may be varied according to the region if the processing is an arithmetic operation. If the processing uses LUTs, a plane of weighting coefficients for the face region is provided and, at the same time, different LUTs are provided for the face region (the extracted specified portion) and the other regions; the results of processing of the respective regions are multiplied by different weights (in the illustrated case, "weight" is used for the face region and "1-weight" for the other regions) and the multiplied results are thereafter combined. If the face and other regions are to have different tones, edges should not be visible; to this end, gradually varying weighting coefficients are, preferably, applied to the neighborhood of the outline of the face so that no discontinuity will occur at the outline of the face. It is noteworthy that the weighting function Matama teaches is related to how different operations in different parts should be blended together.

In co-pending application US20030035578 by Dupin et al. published Feb. 20, 2003 (filed Jul. 12, 2001), titled "METHOD FOR PROCESSING A DIGITAL IMAGE TO ADJUST BRIGHTNESS," an initial scene balance algorithm is applied to the digital image to produce an initially scene balanced digital image, skin-colored pixels in the initial scene balanced digital image are detected according to a pre-determined skin probability density function, and a brightness adjustment amount is calculated based on a statistic of the detected skin-colored pixels and applied to the initial scene balanced digital image to produce a processed digital image having improved overall brightness.

For a series of original images, these methods require further improvements to account for mistakes by the skin pixel detection method in differentiating true skin pixels from other subject matters that accidentally have skin colors.

There is a need therefore, for a more reliable method of identifying skin pixels and an associated method of adjusting the image brightness in response to the outcome of the more reliable skin pixel finding method, that contributes to more desirable quality in the final image.

SUMMARY OF THE INVENTION

The need in the art is addressed, with the present invention, by providing a method of processing a digital image that includes the steps of: assigning belief values to pixels in the digital image, wherein the belief values are proportional to a belief that the pixels are associated with human skin; calculating a brightness adjustment amount based on a statistic of the pixels with belief values exceeding a threshold and the assigned belief values of the pixels; and applying the brightness adjustment amount to the digital image to produce a processed digital image having improved overall brightness.

Another aspect of the present invention provides a method of processing a digital image that includes the steps of: assigning a probability value to skin-colored pixels in the digital image; extracting spatially contiguous regions of skin-colored pixels; producing a main subject skin belief map whose values indicate a belief in each extracted skin-colored region being part of a main human subject, wherein the main subject skin belief map indicates skin-colored regions, in terms of location and an assigned belief value, proportional to the belief that the skin-colored region is associated with the main human subject, having skin pixels, and located in the image; calculating a brightness adjustment amount based on a statistic of the detected skin-colored pixels and the belief values of such pixels; and applying the brightness adjustment amount to the digital image to produce a processed digital image having improved overall brightness.

ADVANTAGES

The invention has the following advantages.

1. The production of a continuously-valued main subject skin belief map based on a plurality of geometric features provides an indication of how likely a skin-colored region is part of the main subject or part of the background.
2. The extraction of spatially contiguous regions of skin color pixels allows further analysis on the likelihood that such regions correspond to the main human subject and thus reduce the mistakes of adjusting brightness based on background regions that inadvertently contain skin colors.
3. The calculation of the brightness adjustment amount in response to the continuous values of the main subject skin belief map through a proper weighting scheme is more robust against errors in the skin detection process.
4. The determination of brightness adjustment for the final image that combines the pre-balancing information with the information provided by skin points allows for controlling the amount of influence of the skin points relative to the remainder of the scene content, including the option to ignore the skin information.

BRIEF DESCRIPTION OF THE DRAWINGS

In describing a preferred embodiment of the invention reference will be made to the series of figures and drawings briefly described below.

DETAILED DESCRIPTION OF THE INVENTION

Figure 1:
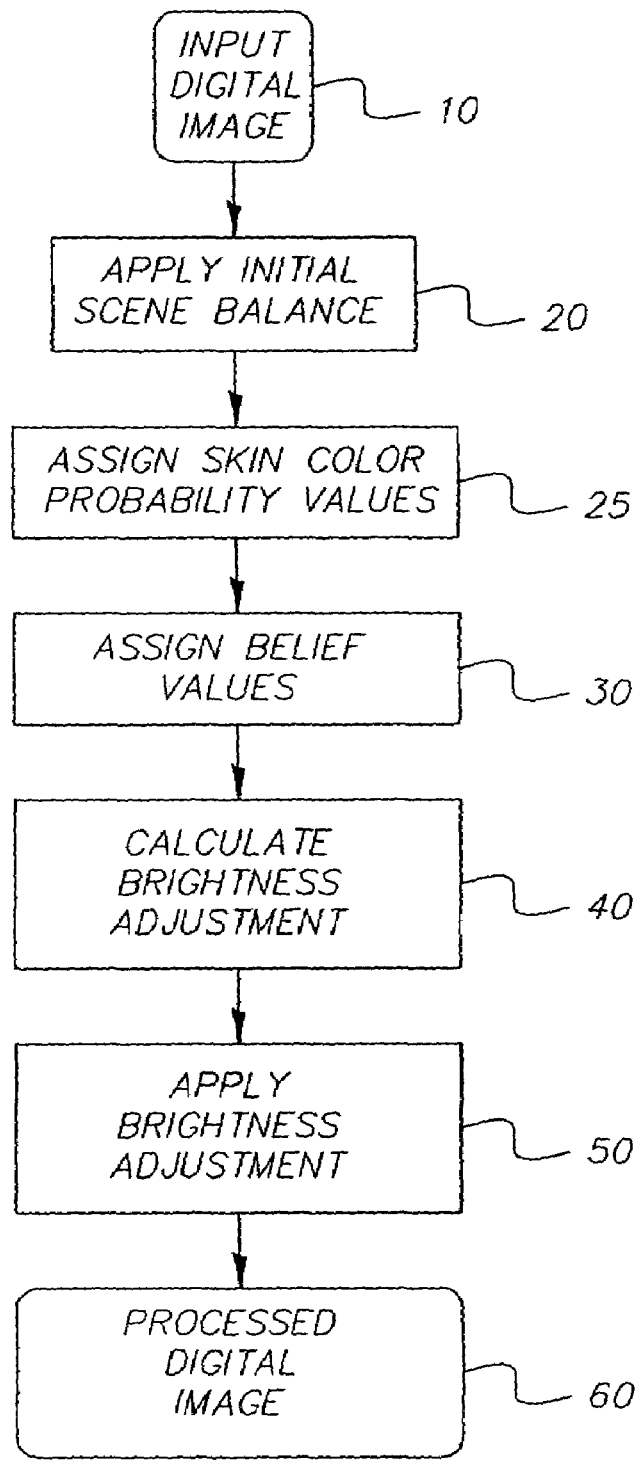
FIG. 1 is a block diagram of a digital image processing system incorporating the present invention.

In the following description, one or more embodiments of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms, systems, hardware, and/or software for producing and otherwise processing the image signals involved, not specifically shown or described herein, may be selected from such systems, algorithms, components, and elements known in the art. Given the system as described according to the invention in the following materials, software not specifically shown, suggested or described herein, that is useful for implementation of the invention, is conventional and within the ordinary skill in such arts.

Still further, as used herein, the computer program may be stored on a computer readable storage medium, which may comprise, for example; magnetic storage media such as a magnetic disk (e.g., a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer, handheld computing device or otherwise and/or an apparatus incorporating a processor for image processing. Consequently, the computer system will not be discussed in detail herein. It is also instructive to note that the images are either directly input into the computer system (for example, by a digital camera) or digitized before input into the computer system (for example, by scanning an original image, such as a silver halide film). The processed digital images can be printed, for example, on photographic paper by a scanning photographic printer to yield an image having improved overall brightness.

The specific algorithms (e.g., skin detection and brightness adjustment) disclosed in the exemplary embodiment(s) of the present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better -or even just to change them), digital fulfillment (digital images in from media or over the web, digital processing with images out in digital form on media, digital form over the web, or printed on hard-copy prints), kiosks (digital or scanned input, digital processing, digital or scanned output), mobile devices (e.g., PDA or cellphone that can be used as a processing unit, a display unit, or a unit to give processing instructions), and as a service offered via the World Wide Web or Internet.

In each case, the algorithm may stand alone or may be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm(s) themselves can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes. In one embodiment of the invention, the skin-colored pixels are detected using an adaptive threshold technique.

Referring to FIG. 1, a digital image is optionally processed 10 by an initial scene balance algorithm 20. The initial scene balance algorithm can be any of the known scene balance algorithms, such as the Evans gray world algorithm, the LATD brightness algorithm, the Kwon color scene balance algorithm, or any other scene balance algorithm. Next, pixels in the digital image are initially assigned skin probability values 25 and belief values 30. A brightness adjustment amount is calculated 40 based on the pixels with belief values exceeding a threshold and their belief values 30. The brightness adjustment is applied 50 to the digital image to produce a processed digital image 60 that has improved brightness balance.

The step of assigning belief values 30 is more completely described with reference to FIG. 2. The pixel RGB values of the digital image are converted to Lst coordinates 120 by the following equations:

$$L=(R+G+B)/\text{sqrt}(3) \qquad \text{(Equation 1)}$$

$$s=(R-B)/\text{sqrt}(2) \qquad \text{(Equation 2)}$$

$$t=(2G-R-B)/\text{sqrt}(6) \qquad \text{(Equation 3)}$$

For each pixel in the cropped image, the probability that it is a skin pixel is computed 130. The skin pixel probability 130 is derived from its coordinates in the Lst space, based on skin probability density functions 125 stored in the algorithm. These skin probability density functions 125 were constructed based on a collection of data for the color-space distributions of skin and non-skin regions in a large collection of scene balanced images. The conditional probability that a pixel is a skin pixel given its Lst coordinates is:

$$Pr(\text{Skin}|L,s,t)=Pr(\text{Skin}|L)*Pr(\text{Skin}|s)*Pr(\text{Skin}|t) \qquad \text{(Equation 4)}$$

where each of the conditional distributions $Pr(\text{Skin}|L)$, $Pr(\text{Skin}|s)$, and $Pr(\text{Skin}|t)$ were constructed by application of Bayes Theorem to the original training distributions for skin and non-skin pixels. In comparison, a few conventional methods for detecting skin, e.g., U.S. Pat. Nos. 4,203,671 and 5,781,276 (both referenced above), use the likelihood probability of $P(\text{color}|\text{Skin})$ to detect skin pixels. A major drawback of using the likelihood probability, though conveniently obtained, is that the probability distribution of non-skin pixels is not accounted for. Consequently, there is a higher likelihood for false detection.

In the most generic form, the conditional probability that a pixel is a skin pixel given its Lst coordinates is $Pr(\text{Skin}|L,s,t)$. Alternatively, one can use $Pr(\text{Skin}|L,s,t)$ directly, or the fully decomposed form of Equation 4, or a partially decomposed form of:

$$Pr(\text{Skin}|L,s,t)=Pr(\text{Skin}|L)*Pr(\text{Skin}|s,t) \qquad \text{(Equation 4a)}$$

Where $Pr(\text{Skin}|s,t)$ represents a non-separable probability density function.

The collection of probabilities for all pixels forms a skin probability distribution for the input image. The skin probability distribution is thresholded to create a binary map such that each pixel is designated as either skin or non-skin. The thresholding is accomplished using an image-dependent adaptive thresholding algorithm, such that a skin probability threshold 140 is customized for the particular image. Conventionally, a fixed threshold is used for all input images. The major drawback of a fixed threshold is the ignorance of the changing statistics in individual images due to changes in image content and imaging condition.

Pixels with higher probability than the threshold are identified 150 as skin pixels while all others are considered non-skin pixels. Labeling the pixels of the cropped image as skin or non-skin produces a binary skin color pixel map 160 for the image. The skin color pixel map is further processed to assign main subject skin belief values 170 and produce a main subject skin belief map 180. To this end, contiguous regions of skin color pixels need to be extracted using a connected component labeling process, as described in Sonka, Hlavac, and Boyle, *Image Processing, Analysis, and Machine Vision*, Brooks & Cole, 1999. Each spatially connected region will be treated as an entity in further analysis that produces an indication of how likely it corresponds to a main human subject in the image.

Figure 4:
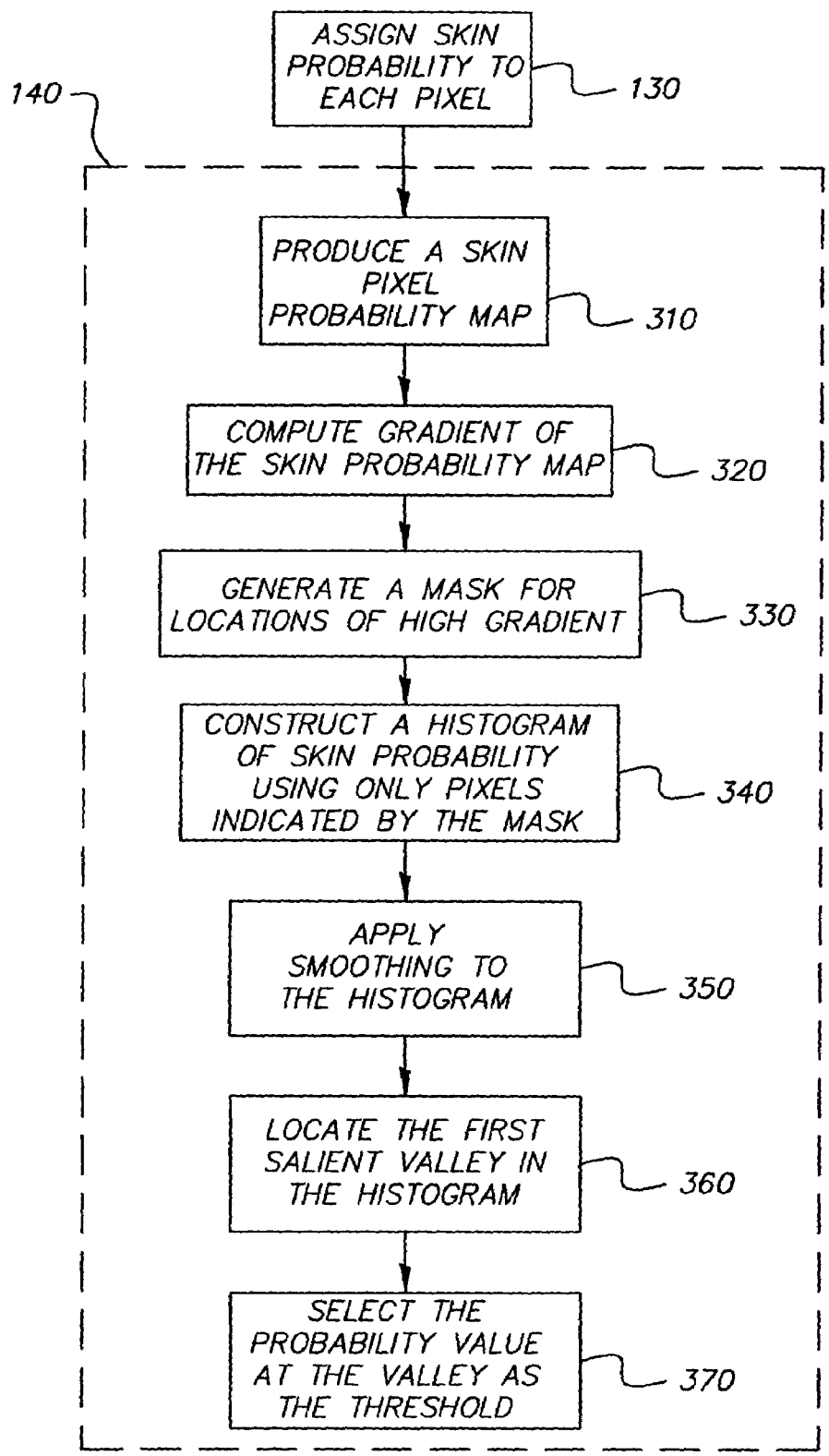
FIG. 4 is a block diagram of the determination of the adaptive threshold in the preferred embodiment of the present invention.

The determination of the adaptive skin probability threshold 140 is more completely described in FIG. 4. After a skin probability value 130 is calculated for each pixel in the image, a skin probability map is produced 310 where the value of each pixel represents the corresponding skin probability. The gradient of the skin probability map is computed 320. The gradient of an image f(x,y) at location (x,y) is defined as $$\nabla f = [G_x, G_y] = \left[\frac{\partial f}{\partial x}, \frac{\partial f}{\partial y}\right]^T \qquad \text{(Equation 5)}$$

and its digital forms are two separable kernels:

$$G_x = \begin{bmatrix} 1 & 0 & -1 \\ 2 & 0 & -2 \\ 1 & 0 & -1 \end{bmatrix} \quad G_y = \begin{bmatrix} 1 & 0 & -1 \\ 2 & 0 & -2 \\ 1 & 0 & -1 \end{bmatrix} \qquad \text{(Equation 6)}$$

The magnitude of the gradient vector is:

$$G = [G_x^2 + G_y^2]^{1/2} \approx |G_x| + |G_y| \qquad \text{(Equation 7)}$$

A mask is generated 330 to indicate those pixels having gradient magnitude values greater than 400. Then, a histogram of skin probability values is constructed 340 using only those pixels with high gradient values. The main advantage of using only the pixels with high gradient values is that they generally correspond to the pixels around boundaries of skin regions. Consequently, the histogram generally exhibits distinctive peaks and valleys because the pixels around skin region boundaries have either high or low skin probability values. The histogram is further smoothed 350 to reduce the effect of noise. Next, a salient valley is located 360 between two peaks, starting from the low end of the histogram. The location of this valley identifies a skin probability threshold 370 for the given image.

Figure 2:
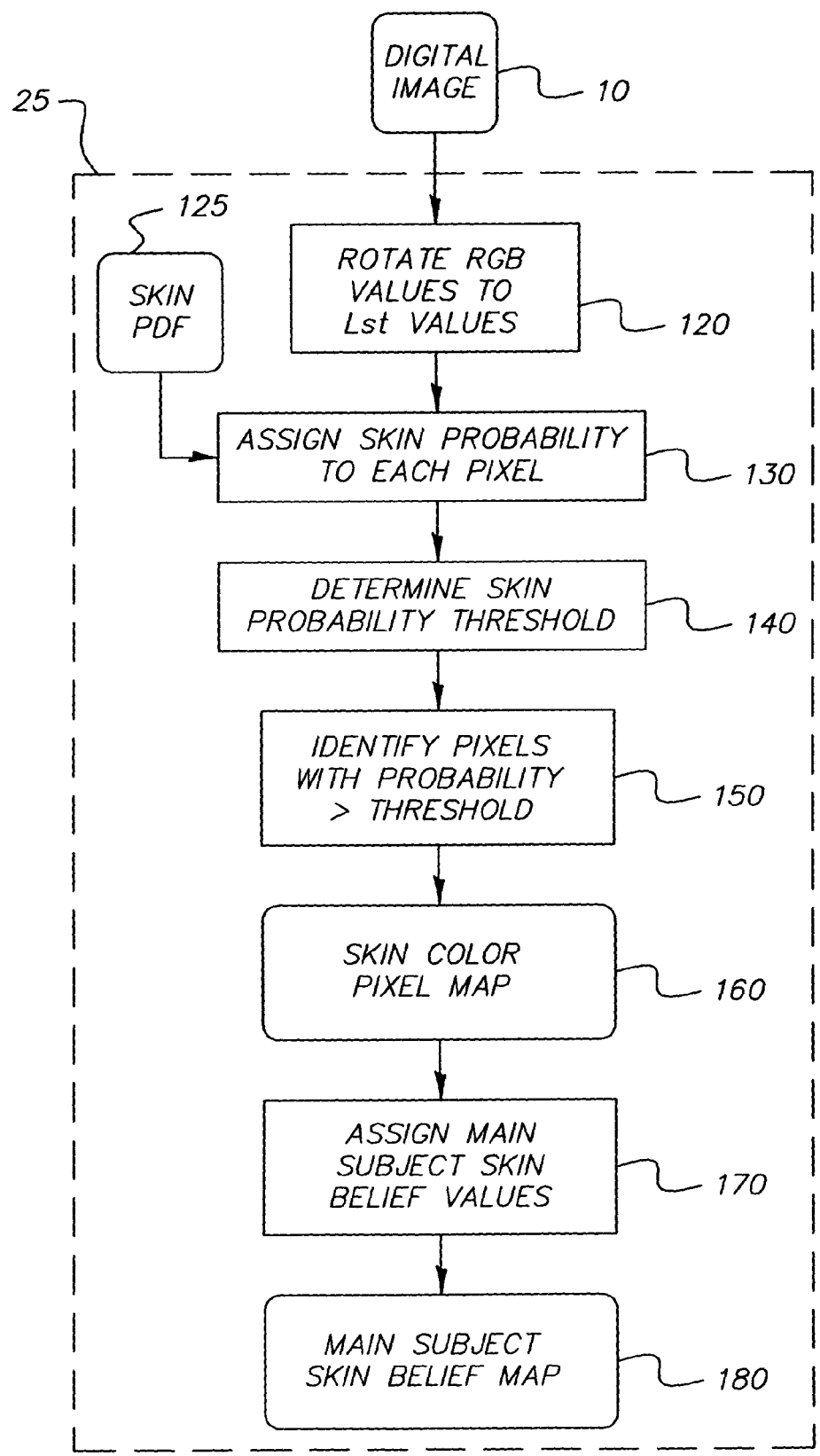
FIG. 2 is a block diagram of the main subject skin region detection.
Figure 5:
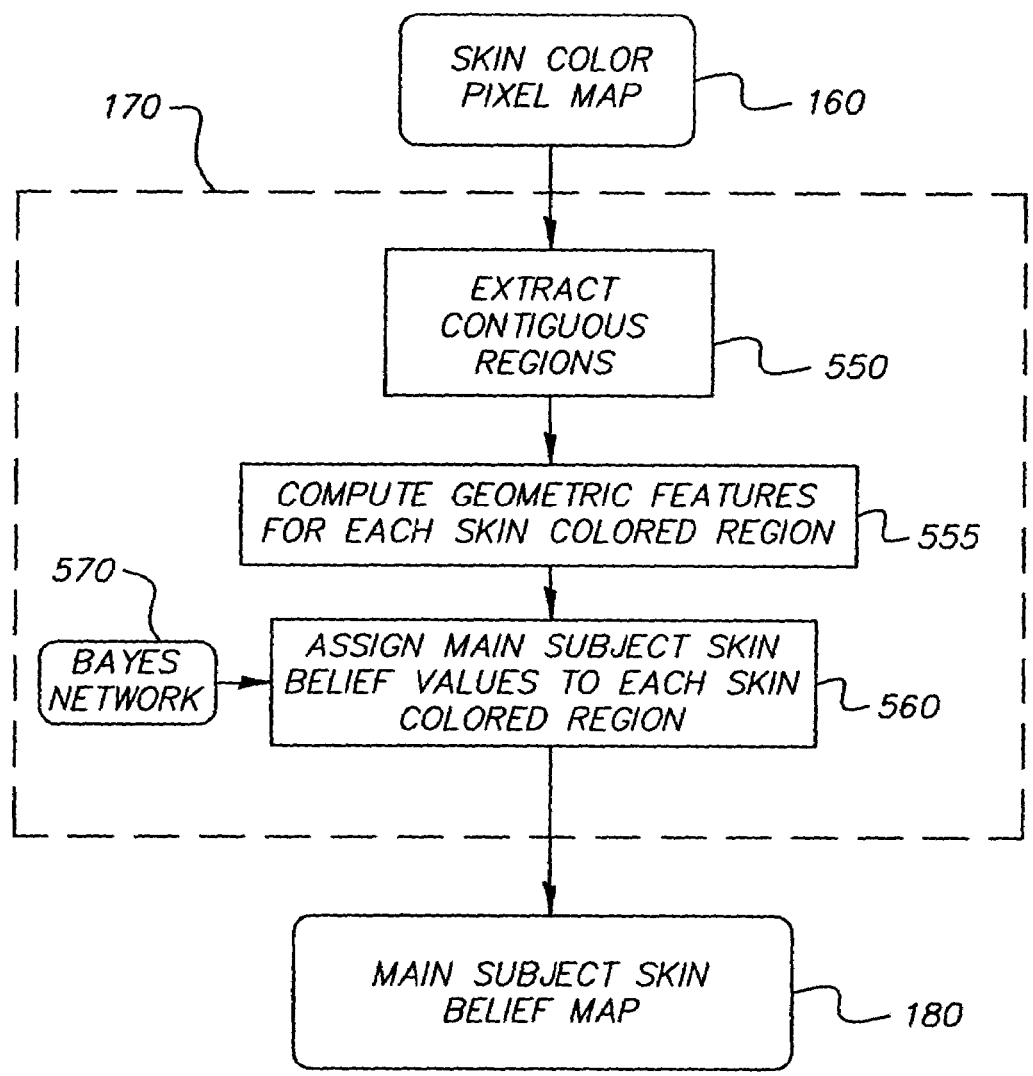
FIG. 5 is a block diagram of the determination of the main subject skin belief map.
Figure 8:
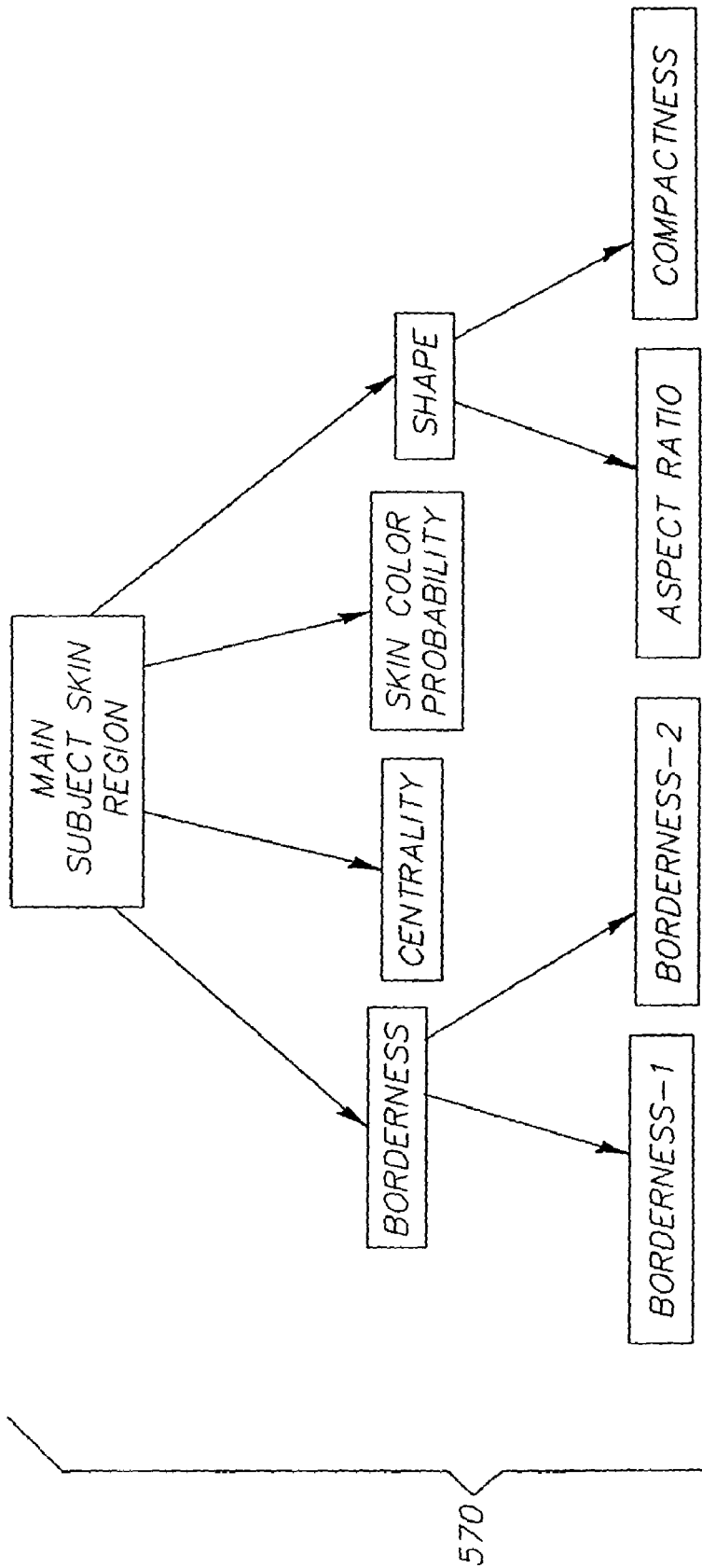
FIG. 8 is a graphical example of the Bayes network according to one embodiment of the present invention.

Referring to FIG. 5, spatially contiguous regions of skin color pixels are extracted 550 using connected component labeling from the skin color pixel map 160 for assigning main subject skin belief values 170, as shown in FIG. 2. The regions are assigned main subject skin belief values 560 based on a plurality of complementary types of geometric features, including centrality, borderness, and shape. These features are computed in step 555. The evidences from these types of geometric features for each region, as well as the average skin probability value of each region, are integrated using a Bayes net-based reasoning engine 570 to yield a final main subject skin belief map 180 indicating how likely a region of concern corresponds to primary skin regions of the main human subjects, e.g., faces, in the picture. For details on Bayes nets, see Judea Pearl, *Probabilistic Reasoning in Intelligent Systems: Networks of plausible Inference*, Morgan Kaufmann Publishers, Inc., San Francisco, Calif., 1988, the contents of which are hereby incorporated by reference. In a single embodiment of the present invention, the Bayes net 570 has a structure as illustrated in FIG. 8. In addition, training of the Bayes net is done using a combination of expert knowledge and actual data to arrive at a set of proper parameters, i.e., conditional probability matrices. Alternative reasoning engines such as a neural network or a rule-based network can be used in place of a Bayes network.

One geometric feature is centrality. In terms of location, the main human subject tends to be located near the center instead of the periphery of the image, therefore, a high degree of centrality is indicative that a region is a main subject of an image. However, centrality does not necessarily mean a region is directly in the center of the image. In fact, professional photographers tend to position the main subject along lines and intersections of lines that divide an image into thirds, the so-called gold-partition positions or rule of thirds.

It should be understood that the centroid of the region alone may not be sufficient to indicate the location of a region with respect to the entire image without any indication of its size and shape of the region. The centrality measure is defined by computing the integral of a probability density function (PDF) over the area of a given region. The PDF is derived from the "ground truth" data, in which the main subject regions are manually outlined and marked by a value of one and the background regions are marked by a value of zero, by summing the ground truth maps over an entire training set. In essence, the PDF represents the distribution of main subjects in terms of location. The centrality measure is devised such that every pixel of a given region, not just the centroid, contributes to the centrality measure of the region to a varying degree depending on its location. The centrality measure is defined as:

$$\text{centrality} = \frac{1}{N_R} \sum_{(x,y) \in R} PDF_{MSD\_Location}(x, y) \qquad \text{(Equation 8)}$$

where (xy) denotes a pixel in the region R, $N_R$ is the number of pixels in region R.

Figure 3A:
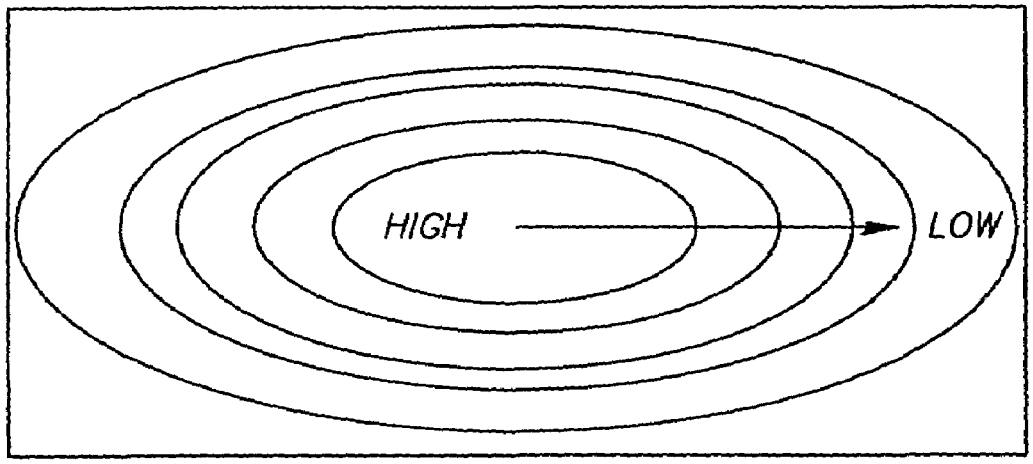
FIG. 3a is a graphical illustration of the probability density function of the main subject when image orientation is unknown.
Figure 3B:
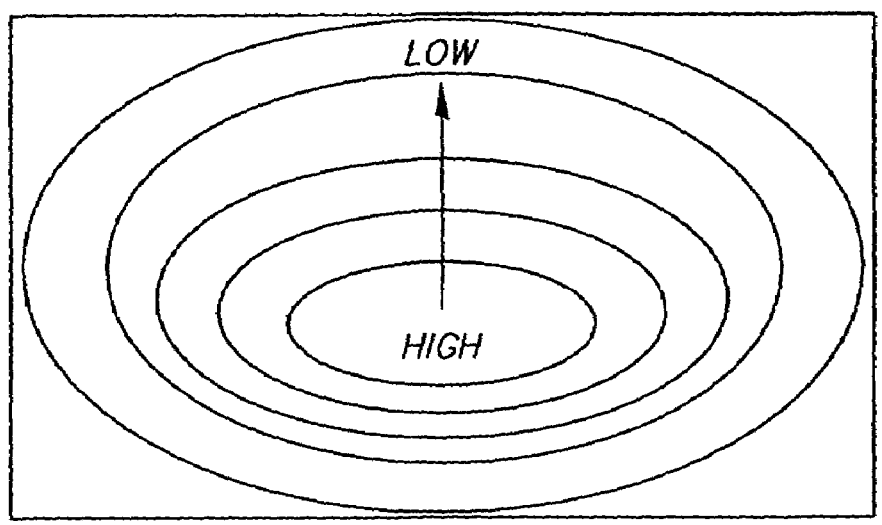
FIG. 3b is the counterpart when the image orientation is known to be upright.

If the orientation is unknown, the PDF is symmetric about the center of the image in both vertical and horizontal directions, which results in an orientation-independent centrality measure. The shape of this PDF is such that objects located in the center of an image are more likely to be the main subject, as illustrated in FIG. 3a. If the orientation is known, the PDF is symmetric about the center of the image in the horizontal direction but not in the vertical direction, as illustrated in FIG. 3b, which results in an orientation-dependent centrality measure. The shape of this orientation-aware PDF is such that objects located in the bottom portion of an image are more likely to be the main subject.

Another geometric feature is borderness. Many background regions tend to contact one or more of the image borders. Therefore, a region that has significant amount of its contour on the image borders is more likely to belong to the background than to the main subject. Two measures are used to characterize the borderness of a region. They include the number of image borders that a region intersects (hereinafter "borderness$_1$") and the percentage of a region's perimeter along the image borders (hereinafter "borderness$_2$").

When orientation is unknown, borderness$_1$, is used to place a given region into one of six categories. This is determined by the number and configuration of image borders that the region is in contact with. A region is in contact with a border when at least one pixel in the region falls within a fixed distance of the border of the image. Distance is expressed as a fraction of the shorter dimension of the image. The six categories for borderness$_1$, are: none, one border, two borders, two facing borders, three borders, and four borders that the region contacts. The more contact a region has with a border increases the likelihood that the region is not a main subject.

If the image orientation is known, the borderness feature can be redefined to account for the fact that a region that is in contact with the top border is much more likely to be background than a region that is in contact with the bottom border. This results in twelve categories for borderness$_1$, determined by the number and configuration of image borders that the region is in contact with. Using the definition of "in contact with" from above, the four borders of the image are labeled as "Top," "Bottom," "Left," and "Right" according to their position when the image is oriented with objects in the scene standing upright.

The second borderness feature, borderness$_2$, is defined as the fraction of the region perimeter that is on the image border. The following definition is used to normalize the feature value to a range from zero to one:

Borderness$_2$=(number_of_region_perimeter_pixels_
on_image_border)/[2*(height_of_image+
width_of_image)]  (Equation 9)

Yet another geometric feature is shape. Many background regions, even though they may be skin-colored, may have a shape that is either extremely elongated (e.g., wood rails) or of extremely complicated shape, while in comparison a face tends to be of a simple, slightly elliptical shape. Therefore, a region that has an extremely high aspect ratio or an extremely low compactness measure is most likely to belong to the background than to the main subject. In one embodiment of the present invention, two measures are used to characterize the shape of a region. They include the aspect ratio of a region (hereinafter "aspect ratio") and the compactness of a region (hereinafter "compactness"), where:

Aspect ratio=(length of the long axis of the minimum
bounding box)/(length of the short axis of the
bounding box)  (Equation 10)

where the minimum bounding box is the smallest rectangle aligned along the long axis of the region and encompassing the region.

Compactness=(perimeter of a region)*(perimeter of a
region)/(area of a region)/4/Pi  (Equation 11)

In one embodiment of the present invention, the shape features are further modified such that they represent a belief value with a maximum value of 1.0, e.g.:

$$\text{Aspect ratio} = 1.0 \quad \text{if aspect ratio} \Leftarrow 2.0 \quad \text{(Equation 12)}$$
$$= 3.0 - \text{aspect ratio} \quad \text{if } 2.0 < \text{aspect ratio} < 4.0$$
$$= -10 \quad \text{if aspect ratio} >= 4.0$$

and $$\text{Compactness} = 1.0 \quad \text{if compactness} \Leftarrow 2.0 \quad \text{(Equation 13)}$$
$$= 3.0 - \text{compactness} \quad \text{if } 2.0 < \text{compactness} < 4.0 \quad (11)$$
$$= -10 \quad \text{if compactness} >= 4.0$$

The output of Bayes net-based reasoning engine 570 is a main subject skin belief map comprised of belief values indicating skin-colored regions, in terms of location and an assigned belief value, proportional to the belief that the skin-colored region is associated with a main subject having skin pixels and located in the image. However, the main subject skin belief map may contain no skin-colored regions at all.

Figure 6:
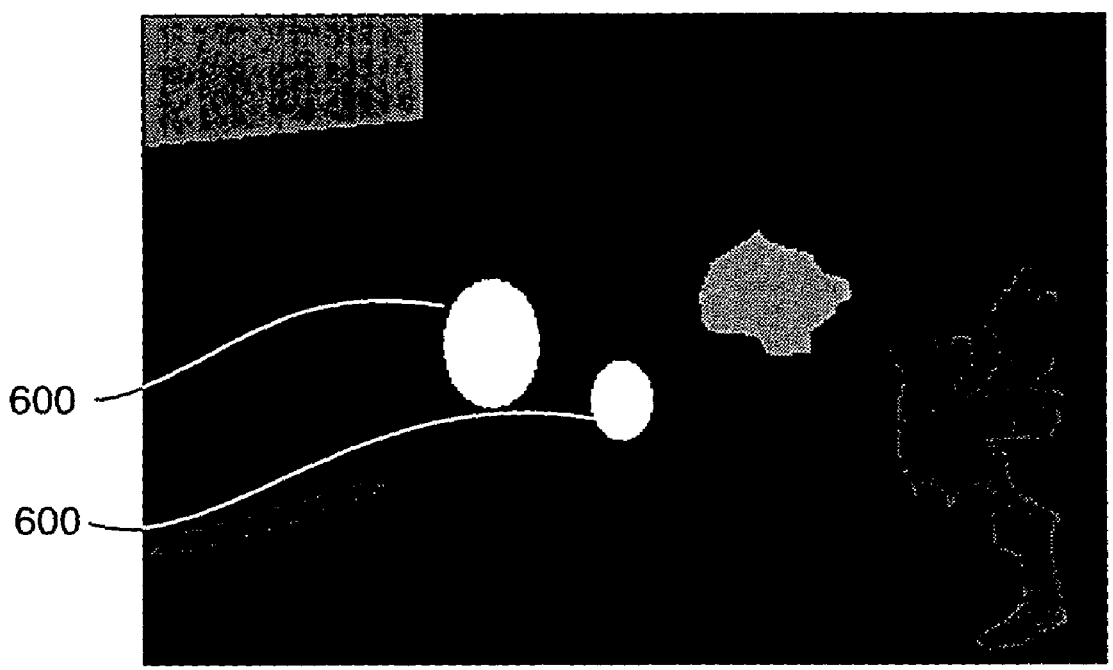
FIG. 6 is a graphical example of a main subject skin belief map.

An example is shown in FIG. 6. Because of the continuum of belief values employed in the belief map, the belief map is more than a binary map that only indicates location of the determined skin pixels related to the main subject. The associated likelihood is also attached to each region so that the regions with large belief values correspond to regions with higher confidence, or belief, that it is part of the main subject. For example, the two elliptical shaped regions 600 in the belief map of FIG. 6 have the highest belief values being part of the main human subjects (faces), while other regions have much lower belief values because they either touch the image borders, are off center, have elongated or complicated shapes, etc. It should be noted that all the skin color pixels within the same spatially contiguous region have the same belief value.

In general, a binary main subject skin mask can be readily obtained by using an appropriate threshold on the belief map. In one embodiment of the present invention, a minimum threshold of 0.25 (out of 1.0) is applied so that any skin color pixels with belief values lower than 0.25 are treated as the background and thus do not affect the calculation of the brightness adjustment amount. In addition, any region that is smaller than 0.25% of the entire image area is eliminated.

However, the rich belief information may be very useful for downstream applications. For example, different weighting factors can be assigned to different skin-colored regions (subject matters) in determining the amount of brightness adjustment, as opposed to treating all the remaining skin regions the same way.

Figure 7:
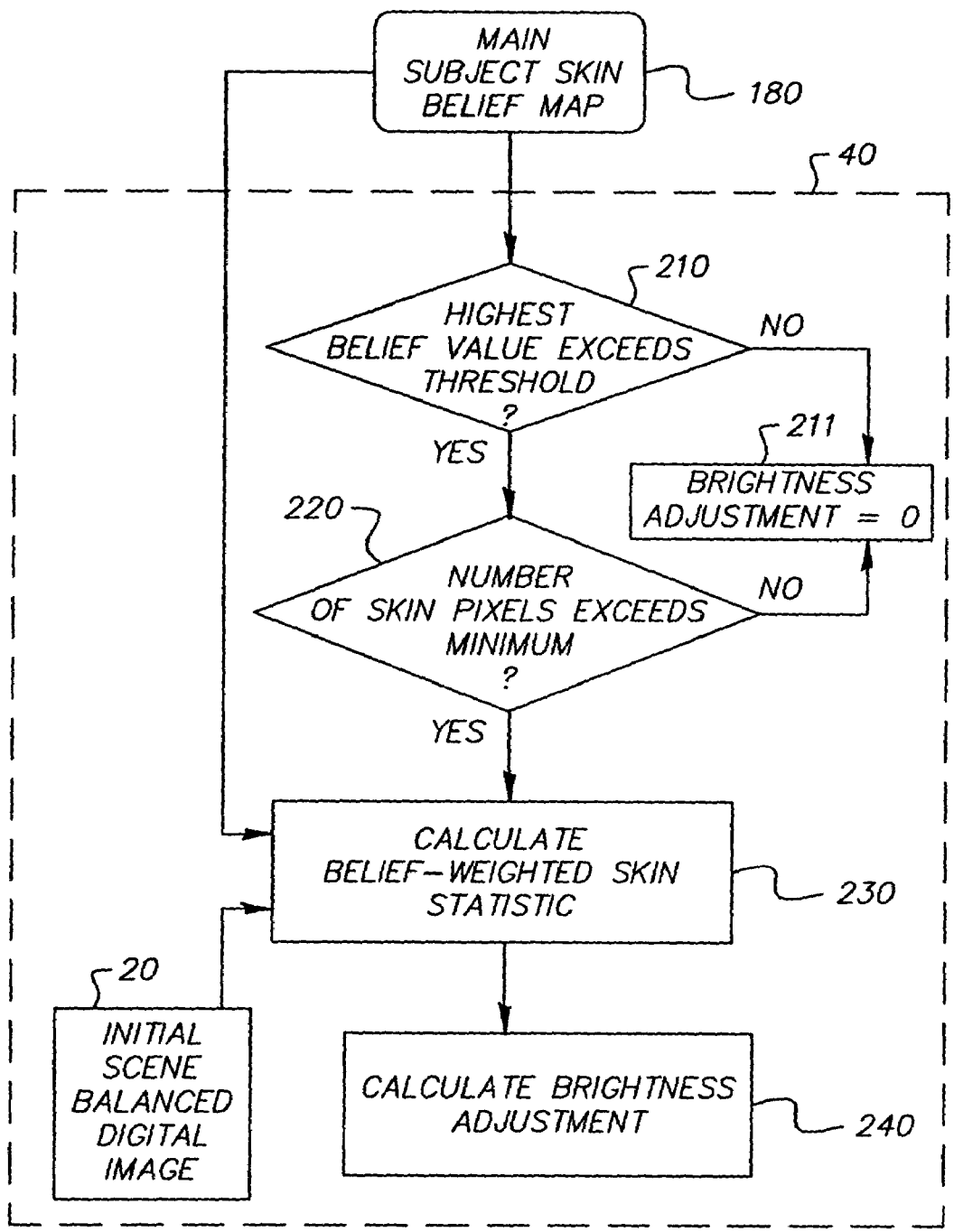
FIG. 7 is a block diagram of determination of a brightness adjustment amount according to the present invention.

The calculation of the brightness adjustment amount 40 (first shown in FIG. 1) is more completely described in FIG. 7. The number of skin color pixels labeled in the main subject skin belief map 180 is compared 210 to a pre-determined minimum value (e.g. less than 0.5%). If the number of skin-colored pixels is less than the minimum value, the brightness adjustment is set to zero 211. If more than the minimum number of skin-colored pixels are found 220, corresponding to the initial scene balanced digital image 20, a skin pixel statistic, weighted by the belief values, is calculated 230 for the image. The statistic is calculated as:

$$SkinStatistic = \frac{\sum_i \sum_j L(i,j) * W(i,j) * S(i,j)}{\sum_i \sum_j W(i,j) * S(i,j)} \quad \text{(Equation 14)}$$

where L(i,j) refers to the L coordinate value for the pixel in the i-th row and j-th column of the image, W(i,j) refers to a weight provided by the main subject skin belief map 180, wherein the highest believed pixels of the image are given the highest weight and other pixels are given lesser weights, and S(i,j) refers to the (0,1) labeling of pixels provided by the main subject skin belief map 180, wherein 0 indicates non-skin pixels and 1 indicates skin-colored pixels as determined by the minimum belief threshold.

There are alternative weighting schemes to achieve different objectives. The following scheme can be used to emphasize higher belief skin pixels while discounting lower belief skin pixels:

$$SkinStatistic = \frac{\sum_i \sum_j L(i,j) * W^2(i,j) * S(i,j)}{\sum_i \sum_j W^2(i,j) * S(i,j)} \quad \text{(Equation 15)}$$

The following scheme can be used to de-emphasize large skin regions to such an extent that each region (uniquely identified by a belief value t) gets a vote regardless of its size:

$$SkinStatistic = \frac{\sum_i W(t)\left[\left(\sum_{i,j,W(i,j)=1} L(i,j)*S(i,j)\right) / \sum_{i,j,W(i,j)=1} S(i,j)\right]}{\sum_i W(t)} \quad \text{(Equation 16)}$$

Those who are skilled in the art can design other weighting schemes that either combine the objectives of these equations or achieve other objectives without departing from the scope of the present invention.

A potential problem of Equations 14-16 is that if the highest belief region in the image has a low absolute belief, e.g., 0.30 (>0.25), the normalization process as indicated by the denominator of the equation would make full-strength brightness adjustment based on a number of low belief skin regions. This is an undesirable effect because these equations enforce relative weighting among skin regions of different belief values while largely ignoring the absolute level of the belief values. To counter this problem, in one embodiment of the present invention, an additional requirement is for the highest belief region to have a belief value higher than 0.80 (out of 1.0). This requirement is tested in step 220. If the condition is not met, the brightness adjustment is also set to zero 211.

As previously described, when a minimum number of skin-colored pixels are not detected, the brightness adjustment amount is set to zero. Otherwise a brightness adjustment value is calculated 240 from the skin statistic as:

brightness adjustment=$B$ (SkinStatistic−$A$)  (Equation 17)

where B and A are predetermined constants. The value of A is a reference value related to the typical L coordinate of skin-colored pixels in images of good brightness quality. The value of B should be between the values 0 and 1, and allows control of the degree of adjustment applied in response to the detected skin-colored pixels. When B is near zero, the brightness adjustments dictated by the skin detection are kept smaller, allowing the brightness of the output digital image to be largely influenced by the entire image content, whereas values of B closer to 1 allow the brightness of the detected skin pixels to primarily determine the brightness of the output digital image.

Alternatively, the brightness adjustment value can be calculated using a nonlinear function of the skin statistic, such as:

brightness adjustment=$f$(SkinStatistic)  (Equation 17a)

where f( ) is a nonlinear function such as a power function.

Referring back to FIG. 1, the calculated brightness adjustment is applied 50 to the digital image 10 to produce the output digital image 60.

The subject matter of the present invention relates to digital image understanding technology, which is understood to mean technology that digitally processes a digital image to recognize and thereby assign useful meaning to human understandable objects, attributes, or conditions and then to utilize the results obtained in the further processing of the digital image.

Further modification and variation can be made to the disclosed embodiments without departing from the subject and spirit of the invention as defined in the following claims. Such modifications and variations, as included within the scope of these claims, are meant to be considered part of the invention as described.

Parts List

- 10 input digital image operation
- 20 scene balance algorithm operation
- 25 assign skin probability operation
- 30 assign belief values operation
- 40 calculate brightness adjustment operation
- 50 apply brightness adjustment operation
- 60 processed digital image operation
- 120 convert to Lst coordinates operation
- 125 skin probability density function operation
- 130 compute skin pixel probability operation
- 140 skin probability threshold operation
- 150 identify skin pixels operation
- 160 binary skin color pixel map operation
- 170 assign main subject skin belief values operation
- 180 main subject skin belief map operation
- 210 compare number of skin pixels operation
- 211 set brightness adjustment to zero operation
- 220 compare the highest belief value to a threshold operation
- 230 calculate skin pixel statistic operation
- 240 calculate brightness adjustment value operation
- 310 produce skin probability map operation
- 320 compute gradient of skin probability map operation
- 330 generate mask operation 340 construct histogram operation
350 smooth histogram operation
360 locate first salient valley operation
370 skin probability threshold operation
550 extract contiguous skin regions operation
555 compute geometric features operation
560 assign main subject skin belief values operation
570 Bayes network operation
600 main subject skin regions

What is claimed is:

1. A method of processing a digital image, comprising the steps of:
   a) assigning belief values according to instructions stored in a computer readable medium to pixels in the digital image, the belief values are subject to: (i) detecting a probability of both human skin color pixels and non-skin color pixels in the digital image and (ii) computing a geometric feature for spatially contiguous regions of skin-colored pixels, wherein the belief values are proportional to a belief that the skin color and non-skin color pixels are associated with human skin;
   b) ascertaining an image dependant adaptive skin probability threshold using both the human skin color pixels and the non-skin color pixels having desired gradient values;
   c) calculating a brightness adjustment amount based on a statistic of the pixels with belief values exceeding the skin probability threshold and the assigned belief values of the pixels; and
   d) applying the brightness adjustment amount to the digital image to produce a processed digital image having improved overall brightness.

2. The method claimed in claim 1, wherein the step of assigning the belief values includes the steps of:
   a1) assigning skin probability values to pixels in the digital image, wherein the skin probability values are proportional to the probability that the pixels are associated with human skin color;
   a2) extracting spatially contiguous regions of the pixels with skin probability values exceeding the threshold; and
   a3) producing a main subject skin belief map comprising belief values indicating a belief in each extracted skin-colored region being part of a main human subject, wherein the main subject skin belief map indicates skin-colored regions, in terms of location and the assigned belief value, proportional to the belief that the skin-colored region is associated with the main human subject, having skin pixels, and located in the digital image.

3. The method claimed in claim 2, wherein the step of producing the main subject skin belief map includes the steps of:
   a3a) computing at least one geometric feature for each spatially contiguous skin-colored region, selected from the group consisting of a centrality feature, a borderness feature, a compactness feature, and an aspect ratio feature;
   a3b) computing the main subject skin belief value for each skin-colored region based on the geometric feature and/or an average skin color probability of the region; and
   a3c) assigning all pixels of each spatially contiguous skin-colored region the same main subject skin belief value.

4. The method claimed in claim 1, wherein the step of calculating a brightness adjustment amount includes the step of:
   c1) calculating a belief weighted average for brightness of the detected skin-colored pixels by a function of the assigned belief values.

5. The method claimed in claim 4, wherein the function is a linear function such that Brightness Adjustment=B*(belief value*average brightness−A), where A and B are predetermined constants.

6. The method claimed in claim 4 wherein the function is a nonlinear function such that Brightness Adjustment=B*[f(belief value)*average brightness−A], where A and B are predetermined constants and f(.) is a nonlinear function.

7. The method claimed in claim 1, wherein an initial scene balance algorithm is applied to the digital image before assigning the probability values to the skin-colored pixels.

8. The method claimed in claim 7, wherein the initial scene balance algorithm is the Evans gray world algorithm.

9. The method claimed in claim 7, wherein the initial scene balance algorithm is the LATD brightness scene balance algorithm.

10. The method claimed in claim 7, wherein the initial scene balance algorithm includes the Kwon color scene balance algorithm.

11. The method claimed in claim 7 for deriving the statistic of the detected skin-colored pixels, in the digital image, comprising the steps of:
    c1) for each pixel in the digital image, calculating a probability that the pixel is a skin-colored pixel;
    c2) determining the skin color probability threshold based on the statistic derived from the digital image; and
    c3) designating any pixels having a probability greater than the skin color probability threshold as skin-colored pixels.

12. The method claimed in claim 11, wherein calculation of the digital image, expressed in RGB coordinates, and the probability that the pixel is a skin-colored pixel includes the steps of:
    c1a) converting the digital image from RGB to Lst coordinates; and
    c1b) determining the skin color probability using a predetermined skin probability density function expressed in Lst coordinates developed from a population of images containing skin and non skin-colored pixels.

13. The method claimed in claim 11, wherein the step of determining the skin color probability threshold includes the steps of:
    c2a) a forming a skin probability map using skin color probability values of all the pixels in the image;
    c2b) computing gradient values from the skin probability map;
    c2c) selecting pixels having gradient values greater than a predetermined value;
    c2d) forming a histogram of skin probability values using only the selected pixels from the previous step;
    c2e) locating a valley point in the histogram; and
    c2f) determining the skin color probability threshold as the skin probability value at the located valley point of the histogram.

14. The method claimed in claim 1, further comprising the step of counting the number of detected skin-colored pixels, and performing the brightness adjustment only if a minimum number of skin-colored pixels are detected.

15. The method claimed in claim 1, further comprising the step of computing the maximum belief value of detected skin-colored pixels, and performing the brightness adjustment only if there is at least one region of skin-colored pixels that has belief values greater than a pre-determined threshold.

16. The method claimed in claim 1, wherein the digital image is obtained by digitization of a picture originally captured on film, by direct capture in a digital camera, or by scanning of a picture on printed media.

17. The method claimed in claim 1, further includes printing the processed digital image having improved overall brightness on photographic paper.

18. A method of processing a digital image, comprising the steps of:
   a) assigning a probability value to skin-colored pixels and non-skin-colored pixels in the digital image according to instructions stored in a computer readable medium;
   b) producing a skin probability map for the image according to the probability value for each of the skin-colored pixels and non-skin-colored pixels in the digital image;
   c) determining gradient values for both the skin and non-skin colored pixels in the digital image;
   d) determining a variable skin probability threshold for the digital image according to selected gradient values of both skin and non-skin colored pixels in the digital image;
   e) extracting spatially contiguous regions of skin-colored pixels;
   f) producing a main subject skin belief map of belief values, wherein the belief values are calculated from the probability values of both the skin colored pixels and the non-skin colored pixels, the belief values indicate a belief in each extracted skin-colored region being pan of a main human subject, wherein the main subject skin belief map indicates skin-colored regions, in terms of location and the belief value, proportional to the belief that the skin-colored region is associated with the main human subject, having skin pixels, and located in the image;
   g) calculating a brightness adjustment amount based on a statistic of the detected skin-colored pixels and the belief values of such pixels; and
   h) applying the brightness adjustment amount to the digital image to produce a processed digital image having improved overall brightness.

19. A computer storage medium having instructions stored therein for causing a computer to perform the method of claim 7.

20. A computer storage medium having instructions stored therein for causing a computer to perform the method of claim 18.

21. A method of processing a digital image, comprising the steps of:
   a) assigning belief values according to instructions stored in a computer readable medium to pixels in the digital image, the belief values are subject to: (i) detecting a probability of human skin color pixels and non-skin color pixels for each pixel in the digital image and (ii) computing a geometric feature for spatially contiguous regions of skin-colored pixels, wherein the belief values are proportional to a belief that the human skin color pixels and non-skin color pixels are associated with human skin;
   b) calculating a brightness adjustment amount based on a statistic of the pixels with belief values exceeding an adaptive skin probability threshold and the assigned belief values of the pixels;
   c) applying the brightness adjustment amount to the digital image to produce a processed digital image having improved overall brightness; and
   d) customizing the adaptive skin probability threshold for the digital image by using an image-dependent adaptive thresholding algorithm dependent on the gradient of both the skin color pixels and the non-skin color pixels in the digital image.

* * * * *

UNITED STATES PATENT AND TRADEMARK OFFICE
CERTIFICATE OF CORRECTION

| | | |
|---|---|---|
| PATENT NO. | : 7,609,908 B2 | Page 1 of 1 |
| APPLICATION NO. | : 10/426592 | |
| DATED | : October 27, 2009 | |
| INVENTOR(S) | : Jiebo Luo et al. | |

It is certified that error appears in the above-identified patent and that said Letters Patent is hereby corrected as shown below:

Issued Patent

| Column | Line | Description of Error |
|---|---|---|
| 14 | 43 | In Claim 13, before "forming" delete "a". |
| 15 | 25 (Approx.) | In Claim 18, delete "pan" and insert -- part --, therefor. |

Signed and Sealed this

Eleventh Day of January, 2011

David J. Kappos
*Director of the United States Patent and Trademark Office*